United States Patent [19]

Vidican et al.

[11] Patent Number: 4,849,585
[45] Date of Patent: Jul. 18, 1989

[54] MODULARLY CONSTRUCTED VEHICLE CONTROL STALK WITH INTERCHANGEABLE PARTS AND SWITCH ASSEMBLY

[75] Inventors: George Vidican, Troy; Dragon Bogovican, Sterling Heights; Victor Herrera, Walled Lake; Jeffrey Wiersing, Livonia, all of Mich.

[73] Assignee: United Technologies Automotive, Inc., Dearborn, Mich.

[21] Appl. No.: 226,170

[22] Filed: Jul. 29, 1988

[51] Int. Cl.⁴ .................. H01H 9/00; G05G 11/00
[52] U.S. Cl. .................. 200/61.54; 74/484 R
[58] Field of Search .......... 200/61.27–61.38, 200/61.54; 74/484 R; D12/177, 174

[56] References Cited

U.S. PATENT DOCUMENTS

| | | | |
|---|---|---|---|
| Re. 32,641 | 4/1988 | Swoveland | 200/61.54 X |
| D. 256,575 | 8/1980 | Moore | D12/177 X |
| 1,716,204 | 6/1929 | Bickford et al. | 200/61.27 |
| 3,511,943 | 5/1970 | Kibler | 200/61.54 X |
| 3,859,489 | 1/1975 | Tomlinson | 200/61.54 X |
| 3,934,101 | 1/1976 | Jones | 200/61.54 X |
| 3,996,433 | 12/1976 | Suzuki et al. | 200/61.54 X |
| 4,219,706 | 8/1980 | Koch et al. | 200/61.54 X |
| 4,503,300 | 3/1985 | Lane, Jr. | 200/61.54 |
| 4,667,067 | 5/1987 | Lane, Jr. | 200/61.54 |
| 4,723,057 | 2/1988 | Lane, Jr. | 200/61.54 X |

Primary Examiner—J. R. Scott

[57] ABSTRACT

A modularly constructed motor vehicle control stalk 10 comprises a handle base 20 that engages any of a plurality of vehicle steering column switch actuator assemblies 14. The base 20 accommodates an interchangeable trim sleeve 48 for styling the control stalk 10 to be cosmetically compatible with any of a variety of vehicle interiors. The trim sleeve 48 is secured to the base 20 and supported by a standardized stalk handle 56 which also acts as a receptacle for a switch knob 84 for actuating any of a variety of vehicle operator functions. The switch knob includes interiorly mounted contacts which engage contact surfaces of a printed circuit board when the switch knob is compressed or rotated.

16 Claims, 2 Drawing Sheets

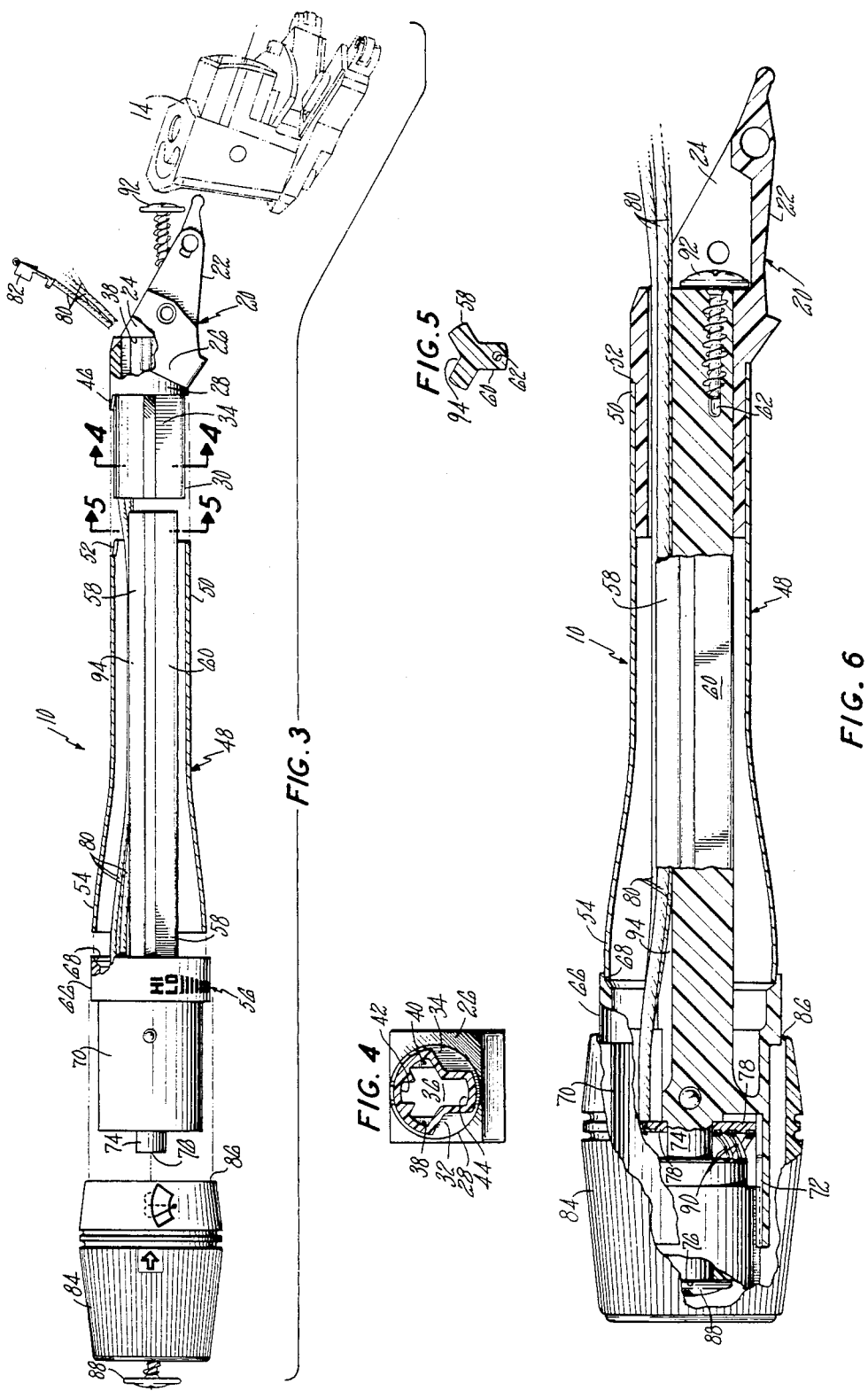

MODULARLY CONSTRUCTED VEHICLE CONTROL STALK WITH INTERCHANGEABLE PARTS AND SWITCH ASSEMBLY

DESCRIPTION

1. Technical Field

This invention relates to vehicle steering column mounted control stalks.

2. Background Art

Motor vehicle turn signal control stalks have evolved into a device for vehicle operators to control a multiplicity of vehicle accessory functions. Modern day turn signal control stalks tend to be multifunction switches from which a vehicle operator, in addition to signalling turns, can control headlights, windshield wipers, and window washers, and can activate vehicle cruise control mechanisms. The multiplicity of functions which have come to reside on modern turn signal control stalks have resulted in a proportional multitude of variations in control stalk styling. This, compounded by seemingly limitless motor vehicle models, requires that innumerable varieties of vehicle turn signal control stalks be designed, assembled and installed into the world motor vehicle fleet.

Because plastic is easily formed and relatively inexpensive, present day turn signal control stalks are likely to be constructed of molded plastic. Plastic molding usually involves fluid plastic entering a molding cavity. When the cavity is completely filled, air is purged from the cavity, additional fluid plastic is entered to compensate for shrinkage and the part is cooled so that it solidifies. Upon solidification, the mold is opened and the part is removed. Molding of large quantities of a plastic part may involve a process wherein several cavities of a tool are filled simultaneously.

Plastic molding tooling tends to be expensive and complex machinery, the expense of which is a function of the complexity of the plastic part to be molded. A complex part may require a mold having several sections that open at right angles to the opening motion of the major mold halves. Several tool actions or a sequence of motions may be necessary to remove a complex part from its mold. Generally, a more complex part requires a more elaborate mold and consequently more expensive tooling.

Motor vehicle control stalks tend to be fairly complex unitary molded parts. A plastic molding process turning out vehicle control stalks may require elaborate tooling and a somewhat complex set of procedures. Because of the variety of control stalks which must be formed via the plastic molding process, various plastic molding machines or tooling must be engaged in accomplishing the task.

In addition to the expense and complexity of tooling required to mold unitary vehicle control stalks, other problems inhere in the process of molding complex plastic parts. The molds tend to be difficult and expensive to maintain. The sequence of actions required in the removal of the plastic parts from the mold may result in increased defects to the parts removed. Also, unitary complex molded plastic control stalks tend to have relatively thick walls which require greater amounts of plastic and a greater amount of time for the plastic to cure after molding than do thinner walls.

Furthermore, unitary complex plastic molded control stalks are limited in terms of styling alternatives since tooling considerations, as discussed above, may make alternative styling prohibitively expensive. Where chrome plate styling is desirable, unitary complex plastic molded control stalks present several difficulties. Because of differences in linear expansion of chrome and plastic, the entire plastic part must be encased in chrome, but the chrome may still tend to flake off over time. Likewise, the tendency of chrome to become unevenly distributed on a plastic surface exacerbates mold cavity variances creating tolerance problems resulting in identical parts with critical dimensions that may be radically different. Unusable parts or "tolerance stack-ups" result.

DISCLOSURE OF THE INVENTION

Objects of the invention include reducing the complexity of a single control stalk part and reducing the complexity and cost of tooling for control stalk manufacture. According to the invention, the complexity of a unitary control stalk part is reduced by constructing the stalk from modular subparts. A vehicle control stalk formed of a combination of parts facilitates inexpensive styling changes and a reduction in the complexity of parts, because several parts are common to many different control stalk models and others are interchangeable for styling purposes.

In further accord with the invention, a handle base is installed, upon which any of a variety of trim sleeves may be mounted for styling. The selected trim sleeve is secured to the handle base and supported by a standardized stalk handle, which is capable of withstanding significant torsional and transversal loads because it is formed with a Y-sectioned design such that strength is gained from shaft structure rather than wall thickness.

Features of the invention include: ease and standardization of assembly across a variety of control stalk models; a simplified process of manufacture; reducing curing time for simpler plastic parts; increased possibilities for styling; reduced problems with chrome flaking; and reduced tolerance problems resultant from non-uniform chrome distribution on plastic, since chrome styling sleeves can be formed from deep drawn metal. Additionally, repair of cosmetically damaged control stalks is easier since replacement of a damaged trim sleeve may be all that is necessary.

These and other objects, features and advantages of the present invention will become more apparent in light of the following detailed description of an exemplary embodiment thereof, as illustrated in the accompanying drawings.

BRIEF DESCRIPTION OF THE DRAWINGS

FIG. 3 is an exploded view of a modularly constructed vehicle control stalk according to the invention;

FIG. 4 is a sectional view of a handle base taken along the line 4—4 of FIG. 3;

FIG. 5 is a sectional view of a shaft portion of a stalk handle taken along the line 5—5 of FIG. 3; and FIG. 6 is a partially broken away and sectioned side elevation view of the modularly constructed vehicle control stalk of FIG. 3, fully assembled.

BEST MODE FOR CARRYING OUT THE INVENTION

Figure 1:
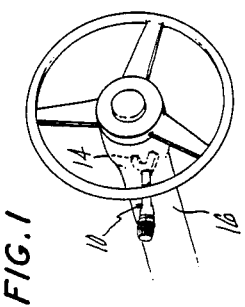
FIG. 1 is a perspective view of a typical vehicle steering column and control stalk thereon.
Figure 2:
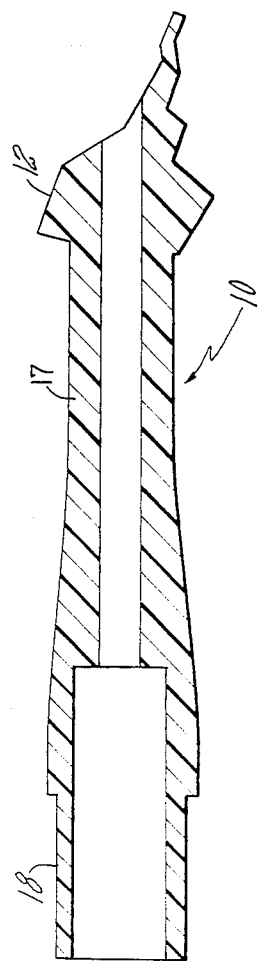
FIG. 2 is a side view of a prior art unitary vehicle control stalk.

Referring now to FIGS. 1 and 2, a vehicle control stalk 10 is attached at a column end 12 to an actuator in a column switch assembly 14 which is housed in a steering column 16. To perform a selected function, the control stalk 10 can be moved by an operator either along an axis which is substantially parallel to the axis of the steering column 16, or along an axis substantially perpendicular to that of the steering column 16. The end of the control stalk 10 opposite the column end 12 is a switch end 18 which may contain switches to activate various other functions controlled via the stalk 10. As seen in FIG. 2, the typical control stalk of the prior art is formed in one piece, with relatively thick outer wall 17 to provide strength to withstand torsional and transversal loads.

HANDLE BASE

Referring now to FIGS. 3-6, a control stalk 10 according to the invention, has a handle base 20 formed of 13% glass-filled nylon, which is tough, durable and maintains integrity under stress. The handle base 20 comprises a triangular member 22, as viewed from the side in FIGS. 3 and 6, which engages with and is attachable to the column switch actuator assembly 14 (FIG. 3). The triangular member has a hollow opening 24. A rectangular front portion 26 (FIG. 4) of the triangular member 22 has a circular base 28 extending at an acute angle therefrom. A semi-cylindrical barrel-like body 30 protrudes from the circular base 28. Two grooves 32, 34 extend the length of either side of a lower portion of the barrel-like body 30. The grooves define interruptions in the otherwise cylindrical perimeter of the barrel-like body 30, forming a key-hole shape as viewed in FIG. 4. A circumscribed substantially Y-shaped void 36 has two abutting members or stops 38, 40 at the back where the void 36 meets the hollow opening 24. A mortise 42 between the upper furcated portion of the Y-shaped void 36 facilitates a passage (after assembly, as described hereinafter) from the outer extreme of the barrel-like body 30 through to the hollow opening 24 of the triangular member 22. An oversized void furcate 44 at the bottom of the Y-shaped void 36 is formed slightly wider than the furcates of the upper furcated portion to facilitate correct alignment during assembly, as described hereinafter. A key 46 is located on an outer surface of the barrel-like body 30 extending from near the circular base 28 outward, parallel with the mortise 42 to assist registration in assembly.

TRIM SLEEVE

A tubular trim sleeve 48 has a small diameter end 50, slightly larger in diameter than the barrel-like body 30 of the handle base 20. The trim sleeve 48 is deep drawn from 260 cartridge brass and plated with chrome or othewise textured as desired. A key way 52 is notched into the small diameter end 50 of the sleeve 48 to register with the key 46. From the key-way end, the trim sleeve tapers outward to a large diameter end 54.

STALK HANDLE

A stalk handle 56, formed of the same 13% glass-filled nylon as the handle base 20, comprises a Y-sectioned shaft 58, as viewed in FIG. 5. The Y-sectioned design of the shaft 58 contributes to stalk support such that the stalk can withstand torsional and transversal loads of magnitudes at least as great as those withstood by the prior art, while it requires significantly less material because of lesser wall thickness. Minimally, torsional loads of about 11 N·m and transversal loads of about 20 N·m may be accommodated by this glass filled nylon, Y-sectioned design. The Y-sectioned shaft 58 is designed with consistent wall shape and thickness providing higher reliability in molding by reducing the potential for bowing. Consistent wall shape permits consistent shrinkage during a shorter curing period, also resulting in less stress concentration along the longitudinal axis of the shaft 58. An oversized shaft furcate 60 as seen in FIG. 5, is slightly wider than two other furcates to permit alignment with the oversized void furcate 44, and it has a starter hole 62 directed inward from the end of the shaft 58. A cylindrical housing labeled portion 66 is integral to and disposed concentrically about the shaft 58 near an end opposite the end having the starter hole 62. The labeled portion 66 has an abutment surface 68 as seen in FIGS. 3 and 6 for interface with the trim sleeve 48. Adjacent to the labeled portion 66, the cylindrical housing has a slightly lesser diameter cylindrical portion 70, having a stop ridge 72 protruding longitudinally on its inner surface. A post 74 extends from within the cylindrical portion 70 to slightly beyond the outer edge and has a tap hole 76 at its center. A circular, washer shaped printed circuit board 78 is disposed within the cylindrical portion 70 and about the post 74. The printed circuit board 78 has electrical contact surfaces on a side oriented toward the tap hole 76. Wires 80, soldered via feed-throughs to the contact surface, extend perpendicularly from a non-contact side of the circuit board 78. The wire ends have plug contacts 82 for connection with a receptacle in the steering column 16, as known in the art.

SWITCH

A switch knob 84, for effecting any functions facilitated by the printed circuit board 78, has an inner diameter 86 slightly larger than the outer diameter of the cylindrical portion 70, such that the knob 84 can be positioned on the cylindrical portion of the handle 56, and fastened using a knob screw 88, driven into the tap hole 76. The knob 84 houses switch contacts 90, as known in the art, for making the electrical connections to the resident printed circuit board 78 to control the various functions residing on the control stalk. Rotation of the knob 84, to effect varied functions, is limited by the stop ridge 72 on the inner surface of the cylindrical portion 70 of the handle 56. The knot 84 may also be actuated or compressed axially to effect functions.

ASSEMBLY

The wires 80 from the printed circuit board 78, pass through the labeled portion 66 of the stalk handle 56 and along a trough 94 best viewed in FIG. 5. The large diameter end 54 of the tubular trim sleeve 48 fits snugly against the abutment surface 68 of the stalk handle 56, and slightly into the cylindrical housing labeled portion 66, such that some stalk handle shaft 58 is exposed beyond the small diameter end 50 of the sleeve 48. The wires 80 pass along the trough 94, beneath the trim sleeve 48 extending beyond the exposed shaft end. Advancing the plug contacts 82 on the wire ends through the Y-shaped void 36 in the barrel-like body 30 of the handle base 20, enables the Y-sectioned shaft 58 of the stalk handle 56 to be installed into the Y-shaped void 36. The wires 80 must be positioned into the mortise 42 and the oversized shaft furcate 60 must be oriented to correspond with the oversized void furcate 44, such that a singular orientation permits the shaft 58 to slide into the void 36. The wires 80 exiting the mortise 42 into the hollow opening 24, and the trim sleeve 48 rotated about the shaft 58 such that the key-way 52 engages the key 46 on the handle base barrel-like body 30, enables sufficient compressive force to be exerted on the parts such that the shaft 58 rests against the handle base stops 38, 40. A base screw 92 installed into the shaft starter hole 62 at the hollow opening 24, when fully installed, holds the shaft 58 against the handle base stops 38, 40 and prevents it from withdrawing.

A variety of vehicle model control stalks can be modularly constructed according to the invention, by installing the handle base 20 into a column switch assembly actuator 14 and attaching a selected trim sleeve 48 using a single base screw 92 installed into the starter hole 62 of the stalk handle 56. Functional capabilities and configuration of the switch knob 84 may vary considerably depending on vehicle model and available options. Consequently, the circular printed circuit board 78 function and layout may differ accordingly.

Although the invention is described as a handle base 20 having a Y-shaped void 36 into which a Y-sectioned shaft 58 is fit and secured, other shapes and fittings may be considered in practicing the invention. Likewise, it may be desirable to have styling using polygonal or other geometries on the trim sleeve 48, as opposed to the tubular or cylindrical sleeve described.

Modularity may be enhanced by increasing or decreasing the number of modules used in converting a complex singular part to multiple more simple partially standardized parts. For example, rather than having the shaft integral to the stalk handle 56, separate shaft and stalk handle might be used.

Similarly, the sequence of assembling the modules of a modularly constructed vehicle control stalk might differ from that described herein and may or may not be critical to the efficacy of the control stalk constructed.

While plastic molding of parts has been described, other methods of forming parts (i.e. machining) might be utilized if desired. Similarly, materials other than those described herein, such as plastic instead of deep drawn brass for a trim sleeve 48 or other polymers or materials reinforced by other than 13% glass, might be used in forming the modules used in constructing the vehicle control stalk 10.

A handle base 20 configured to be compatible with virtually any model or manufacturers column switch assembly 14 might be used in standardizing modularly constructed control stalks across a variety of vehicle models and manufacturers.

Although the invention has been shown and described with respect to an illustrative embodiment thereof, it should be understood by those skilled in the art that the foregoing and various other changes, omissions, and additions in the form and detail thereof maybe made therein without departing from the spirit and scope of the invention.

What is claimed is:

1. A method of constructing a modular vehicle control stalk comprising the steps of:
   (a) selecting a handle base capable of being secured to a column switch assembly suitable for installation in a steering column of a plurality of vehicle models;
   (b) choosing a hollow trim sleeve for styling said vehicle control stalk for compatibility with a vehicle interior of any one of a plurality of vehicle models;
   (c) positioning a stalk handle into said trim sleeve so that a portion of said stalk handle engages said trim sleeve supportively;
   (d) attaching said stalk handle and supportively engaged trim sleeve onto said handle base by fitting said stalk handle slidably into said handle base and fitting said trim sleeve circumferentially about said handle base; and
   (e) securing said stalk handle to said handle base, using a mechanical means for preventing withdrawal of said slidably fitted stalk handle from said handle base,
   whereby said modularly constructed vehicle control stalk comprises, said stalk handle and supportively engaged trim sleeve being attached to said handle base by said stalk handle being slidably fitted into said handle base, said trim sleeve being circumferentially fitted about said handle base and said mechanical means securing said stalk handle from withdrawal from said handle base.

2. The method of claim 1 wherein said handle base has a rigid barrel-like means for slidably installing said trim sleeve circumferentially thereon.

3. The method of claim 2 wherein said rigid barrel-like means defines a void for fitting a shaft means for securing said stalk handle to said handle base.

4. The method of claim 1 wherein said trim sleeve is a hollow tubular member formed of deep drawn metal.

5. The method of claim 1 wherein said stalk handle has a shaft.

6. The method of claim 1 wherein said stalk handle has a substantially Y-shaped cross-sectional shaft.

7. The method of claim 1 wherein said handle base and said stalk handle are formed of glass-filled nylon.

8. The method of claim 1 wherein said handle base and said stalk handle are formed of substantially 13% glass-filled nylon.

9. A modular motor vehicle steering column mounted control stalk for actuating any of a plurality of motor vehicle functions, including functions controlled by switches disposed within the steering column and on said control stalk, said control stalk comprising:
   handle base means for attaching to a steering column mountable column switch assembly, for installation on said steering column in any of a plurality of motor vehicles;
   sleeve means for interchangeably styling said handle base means, said sleeve means formed to be attachable to said handle base means and to be cosmetically compatible for installation on said handle base means for attaching to said steering column mountable column switch assembly for installation on said steering column in any of a plurality of motor vehicle interiors; and
   handle means for supporting said sleeve means and for securing said sleeve means to said handle base means via mechanical attachment of said handle means to said handle base means, said handle means providing a receptacle for switch means for actuating motor vehicle functions.

10. The control stalk of claim 9 wherein said handle base means has rigid barrel-like means for defining a void; and wherein said handle means includes a shaft sized to fit within said void for securing said handle means to said handle base means.

11. The control stalk of claim 10 wherein said shaft means is of a substantially Y-shaped cross-section.

12. The control stalk of claim 10 wherein said shaft means and said handle means are an integral component.

13. The control stalk of claim 9 wherein said sleeve means is a hollow tubular member.

14. The control stalk of claim 9 wherein said handle means includes means for defining a printed circuit board receiving area and a printer circuit board sized to be mounted in said printed circuit board receiving area and which has contact surfaces and wires, said wires mounted to pass within said sleeve means and through said handle base means.

15. The control stalk of claim 14, further comprising a switch knob which is compressed to activate various vehicle functions and which is rotated to activate various other vehicle functions, said switch knob comprising:

switch contacts mounted inside said switch knob such that said contacts, upon compression or rotation actuation of said knob, establish electrical continuity with said contact surfaces located on said printed circuit board.

16. The control stalk of claim 9 wherein said handle base means and said handle means are formed of substantially 13% glass-filled nylon.

* * * * *